United States Patent [19]

Rosen

[11] Patent Number: 4,519,964
[45] Date of Patent: May 28, 1985

[54] PROCESS FOR PREPARING PLASTIC ARTICLES HAVING AN OUTER SHELL AND INNER FOAM CORE

[75] Inventor: Haim Rosen, Tel-Aviv, Israel
[73] Assignee: Rotoplas, Ltd., Jerusalem, Israel
[21] Appl. No.: 572,044
[22] Filed: Jan. 19, 1984
[51] Int. Cl.³ .............................................. B29D 27/00
[52] U.S. Cl. ................... 264/45.4; 264/45.7; 264/46.6
[58] Field of Search ..................... 264/45.4, 46.6, 45.7
[56] References Cited

U.S. PATENT DOCUMENTS

| | | | |
|---|---|---|---|
| 2,989,783 | 6/1961 | Slapnik | 264/45.4 |
| 3,042,967 | 7/1962 | Edberg | 264/45.4 X |
| 3,309,439 | 3/1967 | Nonweiler | 264/45.4 |
| 3,455,483 | 7/1969 | Inklaar | 264/45.4 X |
| 3,505,137 | 4/1970 | Kliene | 264/45.7 X |
| 3,814,778 | 6/1974 | Hosoda et al. | 264/45.4 |
| 3,984,451 | 10/1976 | Weiss | |
| 4,144,296 | 3/1979 | Dickens | 264/45.4 |

FOREIGN PATENT DOCUMENTS 2401034 7/1975 Fed. Rep. of Germany .

Primary Examiner—Philip Anderson
Attorney, Agent, or Firm—Pollock, Vande Sande & Priddy

[57] ABSTRACT

A process for preparing plastic articles having an outer rigid shell and an inner polystyrene foamed core, whereby pre-expanded polystyrene beads are foamed and fused inside a hollow thermoplastic shell, comprising, coating the inside of the shell prior to introducing the polystrene beads into the hollow shell, with a thermoplastic bonding layer.

6 Claims, 1 Drawing Figure

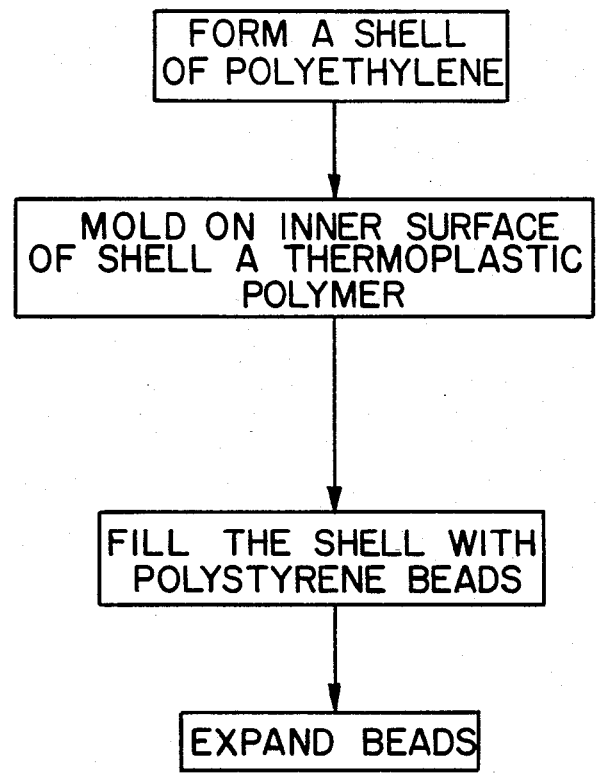

PROCESS FOR PREPARING PLASTIC ARTICLES HAVING AN OUTER SHELL AND INNER FOAM CORE

The present invention relates to a process for the preparation of plastic articles having a thermoplastic outer shell and an inner core of tightly bonded polystyrene foam.

More particularly the invention relates to a method for preparing plastic articles by rotationally molding an outer shell and compressing pre-expanded polystyrene beads inside the shell to give a tightly bonded inner foam core.

Plastic bodies having rotationally molded outer thermoplastic skins and inner foamed cores have been known for some time. For example, U.S. Pat. No. 3,455,483 discloses a method for preparing rotationally molded articles by first molding an outer polyethylene skin and then an inner polyethylene foamed core. Similarly, U.S. Pat. No. 3,505,137 discloses a process for rotationally molding hollow bodies reinforced with a foam core particularly suitable for withstanding high external pressure such as fishing floats. U.S. Pat. No. 3,814,778 discloses yet another method for preparing rotationally molded composite foamed articles in a one step operation. All these methods involve rotationally molding the skin as well as the foam core which limits the method to materials which can be rotationally molded and in the presence of each other. Furthermore, foams prepared by rotational molding as described in the above patents have a generally high density. This is particularly the case where the article is a composite of a dense layer and foam.

There have also been known methods for preparing rotationally molded plastic bodies having a thermoplastic skin and polystyrene foam core. Thus U.S. Pat. No. 2,989,783 describes a method whereby polyethylene powder and a bag of thermoplastic material containing expandable polystyrene beads are rotationally molded. U.S. Pat. No. 3,309,439 discloses a so-called "one shot" process wherein a free flowing molding composition comprising a compound containing chemically bound water is incorporated in the rotational molding process. U.S. Pat. No. 3,984,451 teaches the use of expandable polystyrene beads having less than 3 percent of blowing agent for preparing a foam by rotational molding.

The foregoing patented methods have not been found to be entirely satisfactory in many cases. One of the disadvantages is their limitation to preparing articles of relatively small cross sections, where the foam core between the outer skins is only a few inches thick. This limitation is due to the insulating properties of the foam which prevents proper heat transfer from the outer surface to the inner core, thereby not enabling adequate expansion of, for example, polystyrene beads.

Therefore, where polystyrene foam is desired as the inner core of a rotationally molded article of substantial cross section, the foam is prepared separately after the molded article has been removed from the rotating mold by filling the hollow article with pre-expanded polystyrene beads and introducing steam into the hollow shell, thereby providing the necessary heat to expand and slightly fuse the beads into a foam body. This latter operation is usually conducted in a separate mold whose purpose is to hold the shape of the article and not allow any distortions thereof during the expansion and fusion of the inner core.

Products prepared by the above method have one serious defect in that the polystyrene foam is not bonded to the outer shell and thus easily separates therefrom to form air pockets. Such air pockets deform the shape of the body. Furthermore, they give an unpleasant feeling when pressed, as in the case of a windsurfer when one steps on a section having an air pocket underneath.

It is therefore the object of this invention to provide a method for preparing articles having an outer shell of thermoplastic polymer and a polystyrene foam core which is tightly bonded to the shell.

It is a further object of this invention to provide a method for preparing articles having a composite outer shell comprising a dense layer and a rigid foam layer and an inner polystyrene foam core which is tightly bonded to the shell.

The FIGURE is a diagrammatic representation of our process for making plastic articles.

We have discovered that in the process for making articles having an outer thermoplastic shell and inner polystyrene foam core, wherein the polystyrene core is made by expanding pre-expanded polystyrene beads, if there is applied a bonding layer unto the inner surface of the shell prior to expanding the polystyrene beads, the resulting foam will adhere tightly to the shell.

In particular we have found that if the inner surface of the shell is coated with a layer of a copolymer selected from ethylene-alkyl acrylates, ethylene-alkyl methacrylates and ethylene-vinyl esters prior to expanding the polystyrene beads, a strong bond is formed between the foam and shell.

The preferred process of this invention thus involves:

a. forming an outer shell by rotationally molding a thermoplastic material, b. rotationally molding unto the inner surface of the thermoplastic shell a bonding layer comprising a copolymer selected from ethylenealkyl acrylates, ethylene-alkylmethacrylates and ethylene-vinyl esters, c. filling the shell with pre-expanded polystyrene beads and introducing pressurized steam into the shell to expand and fuse the pre-expanded beads to form a tightly adhering polystyrene foam core.

The method of rotational molding is well established, and the outer shell for preparing articles according to the process of this invention may be prepared in accordance with this known art. Thermoplastics which can be rotationally molded and which can form shells for this invention are, polyethylene, polypropylene, ethylene-propylene copolymers, PVC, polycarbonate, thermoplastic polyesters and others. In general, polyethylene and its copolymers are preferred. This outer shell can be any practical thickness, from 0.5–20 mm thick, preferably 0.5–10 mm thick.

The outer shell can also be a composite made from two or more layers of the same or different polymers. For example, a composite shell can be molded having a dense polyethylene layer and a second inner layer of rigid foamed polyethylene. This type of shell is often preferred, particularly when stiffness and dimensional stability are required. The rigid foam layer of the composite shell can be any thickness desired, but in general it is practical only to thicknesses of less than 10–20 mm.

The bonding layer must be one that is compatible to some extent with the shell and the foamed polystyrene. Preferred materials for this layer are copolymers of ethylene with alkyl acrylates, alkyl methacrylates and vinyl esters. This bonding layer should be thick enough to bond the shell to the polystyrene foam. Practically this is in the order of 0.2–3 mm, preferably 0.3–1 mm.

Suitable copolymers of this type are ethylene-methylacrylate, ethylene-methyl methacrylate, ethylene-ethylacrylate, ethylene-ethyl methacrylate each containing from about 60% up to 95% ethylene and 5% to about 40% acrylate or methacrylate ester, and ethylene-vinyl esters of which ethylene-vinyl acetate (EVA) is most preferred. The EVA usually has a 10% to 40% vinyl content. Rotational molding grade copolymers of these types are available and suitable for use in this invention.

Any pre-expanded polystyrene beads may be used in the process of this invention. These are usually beads of polystyrene impregnated with a blowing agent, such as n-heptane, which have been pre-expanded (foamed) upon application of heat. Residual blowing agent in these foamed beads allows for further slight expansion and fusion of beads to each other at elevated temperature in a confined space. Compressed steam is usually used to bring about the expansion and fusion of the foamed beads to a solid foam block as is known in the art.

The tight bond that is formed between the polystyrene foam and the shell is believed to be due to the softening of the compatible bonding layer of the invention at the expansion-fusion temperature of the polystyrene pre-expanded beads, and the impacting of this layer by the expanding polystyrene. The polystyrene is thus interacted with the bonding layer which is already bonded to the outer shell.

A further advantage of the bonding layer is as follows. As was mentioned earlier, it is often desirable to prepare articles having a composite shell of an outer dense layer and an inner foam layer. Such shells generally have a thin outer dense layer and a thicker rigid foam layer. The outer dense layer may be quite thin, only 0.5–2.0 mm thick and can thus be easily perforated. If the article is to be used in water as, for example, a windsurfer or fishing float, then water can enter the hole in the thin outer skin and penetrate the entire interior of the article, past the foam layer and core which are porous. By applying a layer of ethylene copolymer as defined, between the foam core and the rigid foam layer of the shell, a sealing layer is thus formed which will not allow penetration of water past the outer shell.

EXAMPLE 1

A 250 liter windsurfer was made by rotational molding, having an outer shell of polyethylene and bonded thereto a layer of ethylene vinyl acetate copolymer (EVA). 12 Kg medium density polyethylene were used and 2 Kg of EVA rotational molding grade. The average wall thickness of the polyethylene layer was 2.5 mm and the EVA layer 0.5 mm.

The windsurfer having been cooled and removed from the rotational mold was filled with 2.7 Kg pre-expanded polystyrene beads with density of 13 Kg/m$^3$ and placed into a fitting mold of concrete. Pressurized steam (2–3 atm.) was introduced into the bed of polystyrene beads in the hollow of the shell via pipes, perforated at intervals, to evenly distribute the steam. When the polystyrene was fully expanded the pipes were removed and the windsurfer taken out of the mold. A cross-section of the windsurfer showed a fully foamed core of polystyrene tightly bonded to the shell. This bond remained even after repeated compression. A similar windsurfer filled with polystyrene foam but without an ethylene-vinyl acetate bonding layer showed air pockets between the outer shell and foam core in the cross-sections.

EXAMPLE 2

A 250 liter windsurfer was made by rotational molding, having a composite outer shell comprising a dense layer of polyethylene and a foam layer of polyethylene and bonded thereto a layer of ethylene vinyl acetate copolymer (EVA). For this was used 6.5 Kg medium density polyethylene, 5.5 Kg foamable polyethylene and 2 Kg EVA. The wall thickness was as follows: polyethylene layer 1.5 mm, polyethylene foam layer 5 mm and EVA layer 0.5 mm.

The windsurfer was cooled and removed from the rotational mold and filled with polystyrene foam as in example 1.

The foam core was tightly bonded to the outer shell and no air pockets were formed even after repeated compression.

I claim:

1. A process for preparing plastic articles having a rigid outer shell filled with a core of foamed polystyrene, comprising:
   (a) forming a shell of rigid polyethylene;
   (b) molding into the inner surface of the shell a layer of a thermoplastic polymer selected from copolymers of ethylene and a member selected from the group consisting of alkylacrylates, alkylmethacrylates and vinyl esters;
   (c) filling the shell with pre-expanded polystyrene beads and expanding the beads to fully occupy the hollow of the shell.

2. A process according to claim 1 wherein the rigid shell of polyethylene is a multilayered composite.

3. A process according to claim 2 wherein the composite is a dense layer and a foam layer of polyethylene.

4. A process according to any one of claims 1, 2 or 3 wherein the thermoplastic layer is an ethylene-vinyl acetate copolymer.

5. A process according to any one of the claims 1, 2 or 3 wherein the rigid shell of polyethylene and the inner thermoplastic layer are prepared in situ by rotational molding.

6. A process according to claim 4 wherein the rigid shell of polyethylene and the inner thermoplastic layer are prepared in situ by rotational molding.

* * * * *